Dec. 31, 1935. L. E. KAMPS 2,026,348
BRUSH AND THISTLE CUTTER
Filed June 6, 1934
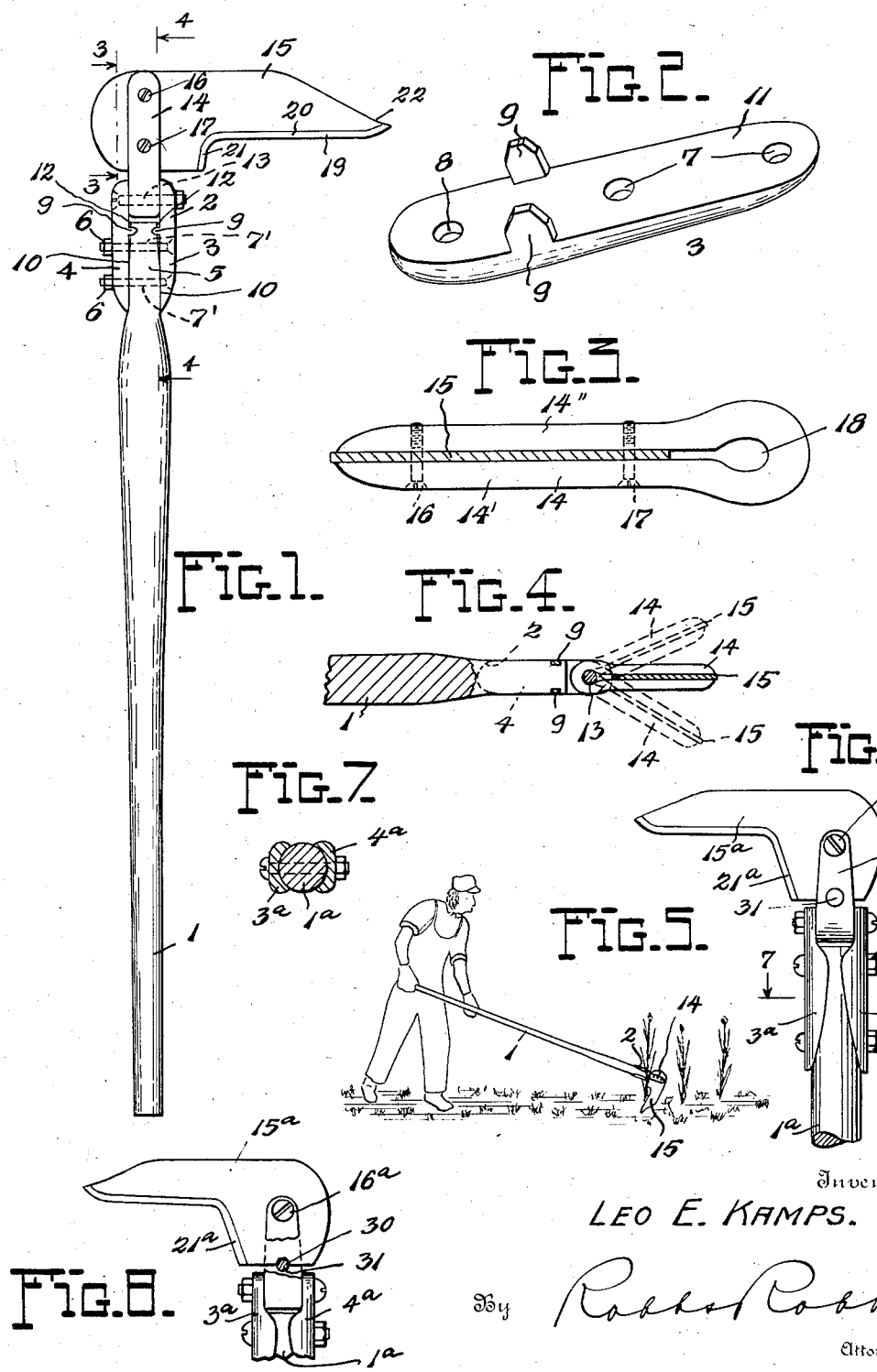
Inventor
LEO E. KAMPS.
By Robb & Robb
Attorneys Patented Dec. 31, 1935

2,026,348

UNITED STATES PATENT OFFICE 2,026,348

BRUSH AND THISTLE CUTTER

Leo E. Kamps, Vermilion, Ohio

Application June 6, 1934, Serial No. 729,306

1 Claim. (Cl. 30—9)

At the present time there is no practical farm implement which is especially designed to be used for the clearing of land from thistles, brush, or the like, in an efficient and time-saving manner.

The clearing of land from brush was done heretofore usually by hand or with the use of sickles and knives, and obviously, this kind of work required quite some effort on the part of the person performing the same. To overcome these difficulties, as outlined above, I have designed a simple device, which can be very cheaply manufactured, and which may be used for the clearing of land from thistles and brush in a most efficient manner without undue effort on the part of the person using the same.

The principal object of the present invention is to provide a simple implement of this kind, which is readily adaptable for the performance of the various land clearing operations in a most efficient and speedy manner, and which is of such a construction as to permit its use for various other purposes as will be more specifically set forth hereinafter.

Another object of this invention is the provision of a device of a character as set forth herein, having means whereby the cutting blade which forms a part of this implement may be adjusted to various cutting positions as desirable to carry out the various working operations for which this farm or garden implement may be especially adapted.

Other and further objects and advantages of the invention will be hereinafter set forth and the novel features thereof defined by the appended claim.

In the accompanying drawing:—

Figure 1 illustrates an elevational view of my garden and farm implement.

Figure 2 is a perspective view of one of the clamping members employed in my construction.

Figure 3 is a sectional view of Figure 1 taken on line 3—3 and illustrating especially the loop-shaped supporting member for the blade.

Figure 4 is a sectional view taken on line 4—4 of Figure 1, illustrating how the cutting blade may be adjusted to various positions.

Figure 5 is a somewhat diagrammatic view illustrating the use of my implement for cutting thistles, brush or the like.

Figure 6 illustrates a modified form of my brush and thistle cutter.

Figure 7 is a sectional view taken on line 7—7 of Figure 6.

Figure 8 is a view similar to Figure 6, parts being broken away.

Referring now to the drawing, 1 illustrates a handle, which may be preferably made of wood, or similar material. The numeral 2 indicates a clamping unit which comprises the complemental clamping members 3 and 4 which are secured to the lower portion 5 of the handle by means of bolts 6 or the like. The complemental clamping members 3 and 4, a detail view of which is shown in Figure 2, are provided with holes 7 and 8, and comprise further extension members 9 which are adapted to engage the lower handle portion 5 and to partly penetrate into the same, as will be clearly seen from Figure 4.

These extension members are primarily adapted to prevent the splitting of the lower portion of the wooden handle when the clamping members are clamped together in a manner, as will be hereinafter described.

The lower portion of the wooden handle is provided with holes 7' arranged in such a manner as to coincide with the holes 7 in the clamping members 3 and 4 when the same are attached to the lower portion 5 of the handle. The bolts 6 are passed through the openings 7 in the clamping members and 7' in the lower portion of the handle, and the clamping members may in this fashion be securely clamped and mounted upon the handle portion 5, as will be obvious from Figure 1. It will be seen that when the clamping unit 2 is arranged on the handle, as has been described above, the extensions 9 of the complemental clamping members will also serve to hold the clamping members in proper position with respect to the handle. The lower handle portion 5 may be preferably made in a rectangular cross section although this is not absolutely necessary, but it is of importance that the two sides 10 of the lower handle portion which are adjacent the clamping members 3 and 4 be machined into a straight surface, which will coincide with the respective surfaces 11 of the clamping member so that a perfect attachment of the latter to the handle may be accomplished. These two surfaces 10 of the lower handle portion 5 may be slightly tapered toward the lower end of the handle, as shown at 12, to permit a further clamping together of the clamping members for reasons as will be mentioned later on.

Secured to the clamping unit 2 by means of a bolt 13 is a loop-shaped supporting member 14, to which a cutting blade 15 is attached by means of screws 16 and 17 which are preferably countersunk, as clearly illustrated in Figure 3. The loop-shaped supporting member 14 is of a configuration, as clearly illustrated in Figure 3. The two shanks 14' and 14" of this member lie flatly against the cutting blade 15, as will be clearly seen from this illustration. The loop-shaped supporting member forms an eye as shown at 18 in Figure 3 through which the bolt 13 may be passed when the same is attached to the clamping unit 2. The holes 8 of the clamping members 3 and 4 permit the passage of the bolt 13 therethrough, as will be clearly understood from the drawing.

It will be readily seen that the connection between the supporting member and the clamping unit 2 permits an angular adjustment of the blade with respect to the handle when the bolt 13 is somewhat loosened. In this manner the blade may be adjusted to an angularity with respect to the handle, which is most desirable for the performance of the respective land clearing operations. In tightening the bolt 13, the clamping members 3 and 4 may be somewhat more clamped together so as to rigidly hold the blade in the adjusted position. This additional clamping operation may be performed because of the tapered end portions 12 of the handle 1 without any possibility of splitting the lower end of the handle portion, which splitting is also prevented by the extensions 9 of the clamping members 3 and 4, as previously described herein.

The blade 15 employed in my novel implement is of a unique construction. It will be noted from Figure 1 that this blade is provided with the cutting edge 19 which comprises the edge portions 20 and 21 disposed to each other in a substantially right angle. The advantage gained by this construction is of great importance because the straight cutting edge alone will not perform the working operations to which this device is to be adapted. If the brush or thistles are not cut by the edge portion 19, such cutting operation will be perfectly performed by the edge portion 21. The blade 15 may be manufactured preferably from heavy sheet steel stock. It may be pointed as at 22, so as to penetrate more easily through thick underbrush, or the like.

As previously stated, the device of the present invention may be used for many purposes, and is not solely limited to the clearing of land from thistles and brush, as for instance, small branches of trees or other plants, which are far above the ground and hard to reach, may be trimmed with this device, and similar and other uses of the implement will be obvious to those skilled in the art.

The adjustability of the blade permits the use of this cutting device also by left handed persons, as can be readily observed from the accompanying drawing. The implement is used in like manner, as a scythe, as obvious from Figure 5, and no further explanation upon this point is deemed necessary.

Figures 6 to 8 illustrate a modified form of the present invention wherein the clamping members 3a and 4a are of a configuration so as to properly engage a round handle 1a. The employment of the round handle reduces considerably the cost of manufacture of this farm implement and this modified structure will therefore be very advantageous for mass production. No specific handle structure as illustrated in Figure 1 is necessary for the construction of this device. The inner sides of the clamping members 3a and 4a are curved to conform to the curvature of the handle as seen in Figure 7 so that a perfect engagement between the clamping members and the handle 1a may be facilitated. The clamping members are secured to the handle 1a by means of the bolts 6a in a manner obvious from Figures 6 and 7. The structure of the blade 15a has been slightly varied and the connection between the blade 15a and the supporting member 14a has also been simplified very considerably. Only one screw, 16a, is necessary for establishing the connection between the blade 15a and the supporting member 14a in view of the fact that the blade portion adjacent the clamping members is provided with a cut-out portion 30 which is adapted to engage a pin 31 within the supporting member 14a in such a manner as to establish a rigid connection with the screw 16a as will be necessary for the performance of the land clearing operations for which this tool is designated. The cutting edge portion 21a has been increased in length because it has been found that such blade construction is more desirable in cases where a more speedy performance of land clearing operations is desired. In other words the blade construction described above is capable of cutting a larger amount of brush, thistle, or the like in the same time interval as would be the case with the blade construction disclosed in Figure 1.

Having thus described my invention, what I claim as new and desire to secure by Letters Patent of the United States, is:—

In a device of the class described, in combination, a handle, a flat blade having a cutting edge disposed towards one side of the handle in transverse relation to the handle and operative incident to lateral sweeping of the handle, a supporting member comprising a part bent upon itself so as to provide an eye having laterally spaced shanks extending therefrom and between which the blade is received and rigidly clamped by fastenings extending therethru, clamping means including a unit composed of two spaced clamping members secured at opposite sides of the handle and bearing on opposite sides of the supporting member in a direction in substantially the plane of the direction of said cutting edge, a pivot connection between the clamping members and the supporting member, said pivot connection passing through the supporting member eye in line with the plane of the blade, and fastening means for securing the clamping members to the handle and clamping them against the supporting member with clamping pressure in a plane parallel with the plane of the blade and said cutting edge, so that as the handle is swept laterally to cause action of the cutting edge of the blade the pressure generated on the blade is in the direction of the axis of the said pivot connection and does not tend to swing the blade about said axis, the clamping members being formed with integral extensions at opposite edges thereof extending toward each other and disposed at opposite sides of the handle to confine the material of the latter as set forth.

LEO E. KAMPS.